United States Patent
Smyth

(10) Patent No.: US 10,467,434 B2
(45) Date of Patent: **\*Nov. 5, 2019**

(54) COMPUTER-IMPLEMENTED METHOD FOR IMPROVING A SOCIAL NETWORK SITE COMPUTER NETWORK, AND TERMINAL, SYSTEM AND COMPUTER READABLE MEDIUM FOR THE SAME

(71) Applicant: Benjamin Ashley Smyth, Paris (FR)

(72) Inventor: Benjamin Ashley Smyth, Paris (FR)

( * ) Notice: Subject to any disclaimer, the term of this patent is extended or adjusted under 35 U.S.C. 154(b) by 46 days.

This patent is subject to a terminal disclaimer.

(21) Appl. No.: 15/540,261

(22) PCT Filed: Dec. 16, 2015

(86) PCT No.: PCT/US2015/066174
§ 371 (c)(1),
(2) Date: Jun. 28, 2017

(87) PCT Pub. No.: WO2016/109209
PCT Pub. Date: Jul. 7, 2016

(65) Prior Publication Data
US 2017/0372097 A1 Dec. 28, 2017

Related U.S. Application Data

(63) Continuation-in-part of application No. 14/712,882, filed on May 14, 2015, now Pat. No. 9,391,975.
(Continued)

(51) Int. Cl.
*G06F 21/62* (2013.01)
*G06F 16/435* (2019.01)
(Continued)

(52) U.S. Cl.
CPC ........ *G06F 21/6263* (2013.01); *G06F 16/437* (2019.01); *G06Q 50/01* (2013.01); *G06Q 99/00* (2013.01)

(58) Field of Classification Search
CPC .......... G06F 21/6263; G06F 17/30035; G06F 16/437; G06Q 99/00; G06Q 50/01
See application file for complete search history.

(56) References Cited

U.S. PATENT DOCUMENTS

2009/0287837 A1* 11/2009 Felsher ................ G06F 19/328
709/229
2010/0280965 A1 11/2010 Vesterinen et al.
(Continued)

OTHER PUBLICATIONS

International Search Report (ISR) relating to International Application No. PCT/US2015/066174, dated Jun. 10, 2016.
(Continued)

*Primary Examiner* — Carl G Colin
*Assistant Examiner* — Han Yang
(74) *Attorney, Agent, or Firm* — The Harris Firm

(57) ABSTRACT

A method, at a terminal in a digital communications network, comprising: establishing direct or indirect communication access and linkage between the user-operated terminal and at least one remote computer(s) on which are stored, or by which access is available to prevent legible display of, stored user account object data; displaying indicia, or broadcasting data, representative of or indicating one or more predetermined criteria for selecting a subset of the stored user account object data; collecting data, representative of, or indicating, only the subset of the stored user account object data; and transmitting instructions to prevent legible display of the subset of the stored user account object data, according to the collected data representative of, or indicating, the one or more predetermined criteria for selecting the subset of the stored user account object data, from the terminal to the at least one remote computer(s). A terminal, system, and computer readable medium are also disclosed.

20 Claims, 4 Drawing Sheets

Related U.S. Application Data

(60) Provisional application No. 62/098,305, filed on Dec. 30, 2014.

(51) Int. Cl.
*G06Q 50/00* (2012.01)
*G06Q 99/00* (2006.01)

(56) References Cited

U.S. PATENT DOCUMENTS

| | | | |
|---|---|---|---|
| 2011/0023129 A1* | 1/2011 | Vernal | G06F 21/6245 726/28 |
| 2013/0013683 A1 | 1/2013 | Elliott | |
| 2014/0067702 A1* | 3/2014 | Rathod | G06Q 10/10 705/319 |

OTHER PUBLICATIONS

Written Opinion of the ISA relating to International Application No. PCT/US2015/066174, dated Jun. 10, 2016.
USPTO, Non-Final Rejection relating to U.S. Appl. No. 14/712,882, dated Jul. 16, 2015.
USPTO, Non-Final Rejection relating to U.S. Appl. No. 15/206,340, dated Oct. 24, 2016.
USPTO, Final Rejection relating to U.S. Appl. No. 15/206,340, dated May 17, 2017.
USPTO, Non-Final Rejection relating to U.S. Appl. No. 15/206,340, dated Nov. 17, 2017.
EPO, Supplementary European Search Report relating to EP 15875964.7, dated Jun. 28, 2018.
EPO, Supplementary European Exam Report relating to EP 15875964.7, dated Jul. 22, 2019.

* cited by examiner

COMPUTER-IMPLEMENTED METHOD FOR IMPROVING A SOCIAL NETWORK SITE COMPUTER NETWORK, AND TERMINAL, SYSTEM AND COMPUTER READABLE MEDIUM FOR THE SAME

CROSS-REFERENCE TO RELATED APPLICATION(S)

This application is a U.S. National Stage Patent Application of PCT International Patent Application Ser. No. PCT/US2015/066174 (filed on Dec. 16, 2015) under 35 U.S.C. § 371, which is a continuation-in-part, and claims the benefit, of U.S. patent application Ser. No. 14/712,882 (filed on May 14, 2015) under 35 U.S.C. §§ 120 and 363, which claims the benefit of U.S. Patent Application Ser. No. 62/098,305 (filed on Dec. 30, 2014) under 35 U.S.C. § 119(e), which are all hereby incorporated by reference herein in their entireties.

TECHNICAL FIELD

The present disclosure relates to a computer-implemented method for one or more of increasing data processing efficiency and improving data security, of one or more computers communicatively connected to a digitally stored and operated social network site computer network; and a terminal, a system and a computer-readable medium for the same.

BACKGROUND

Current attempts to control the shear amount, the digital manipulation, the aggregation, and the dissemination of sensitive personal information stored across computer-implemented social network site storage networks are resource, energy, and time consuming. These attempts consume resources, energy, and time—on all three of individual, organizational and large-and-mega-scale digital computer server and non-server networks.

Some advocate abstinence or discontinued use, which negates the technological advantages of social network site computer networks.

Others suggest sacrificing security by allowing all information to proliferate without reservation or with minimal reservation, which causes an overabundance of distributed content.

Still others teach identification management by identifying Facebook® and Twitter® content containing text (e.g., profanity) or objects in photos (e.g., beer cans), which have been previously defined in a blacklist. Blacklist techniques suffer from several problems such as the inability to technically scale them for network-wide use, such that large volumes of data cannot be managed. They also lead to false positives, wherein valued objects are unduly deleted.

On an individual scale, it is estimated that, for example, an average Facebook user account stores nearly 8500 new data objects per year, which it is estimated would take more than two days to identify and delete on an item-by-item basis assuming that it takes about 5 seconds to identify and remove each object.

It would be desirable to provide a more effective method of creating more efficient digital privacy management, which would reduce the storage space required to store, the bandwidth to aggregate and calculate, and/or the computing resources, time, and energy previously required, especially as regarding management of redundant and private, sensitive personal data.

SUMMARY

As used herein, an "account user terminal" is a terminal authorized, via a unique set of social network site account user-held access credentials, to control a particular social network site user data profile assigned or related to a particular social network site account user.

First and second aspects of the disclosure may or may not be directed to respective method and computer readable medium (or alternately throughout "computer storage apparatus") causing operations, for each comprising any one or more of: collecting or accessing data uniquely representative of, or uniquely indicating, one or more social network site user account(s) and transmitting data necessary to access and control the one or more digitally stored and operated social network site user account(s) to at least one computer(s); establishing direct or indirect communication access and linkage between the terminal and the at least one computer(s) on which are stored, or by which access is available to control, stored user account object data that were input or modified during prior access to and control over the one or more social network site user account(s) or associated social network site user account(s) that at some prior time had permission to edit data in, or append data to, the stored user account object data of the one or more social network site user account(s), the stored user account data of the one or more user account(s) uniquely accessible based on access data digitally pre-assigned to the one or more social network site user account(s); displaying indicia, or broadcasting data, representative of or indicating one or more predetermined criteria for selecting a subset of the stored user account object data; collecting data representative of, or indicating, the subset of the stored user account object data based on the one or more predetermined criteria for selecting the subset of the stored user account object data that were input or modified during prior access to and control over the one or more user account(s) or associated social network site user account(s) that at some prior time had permission to edit data in, or append data to, the user account object data of the one or more user account(s); and transmitting instructions to prevent display of the subset of the stored user account object data at (optionally, every and/or user-selected) user account terminal(s) in the social network site computer network, according to the collected data representative of, or indicating, the one or more predetermined criteria for selecting the subset of the stored user account object data, from the terminal to the at least one remote computer(s); wherein the instructions are calculated to prevent the display of the selected subset of the stored user account object data at at least one user account terminal in the social network site computer network, based on the one or more predetermined criteria.

Third and fourth aspects of the disclosure may or may not be directed to respective processor-based terminal and processor-based system, each comprising any one or more of: a first module arranged to collect or access data uniquely representative of, or uniquely indicating, the one or more social network site user account(s) and transmitting data necessary to access and control the one or more digitally stored and operated social network site user account(s) to at least one remote computer(s); a second module arranged to establish direct or indirect communication access and linkage between the terminal and the at least one remote computer(s) on which are stored, or by which access is available to control, stored user account object data that were input or modified during prior access to and control over the one or more social network site user account(s) or associated social network site user account(s) that at some prior time had permission to edit data in, or append data to, the stored user account object data of the one or more social network site user account(s), the stored user account data of the one or more user account(s) uniquely accessible based on access data digitally pre-assigned to the one or more social network site user account(s); a third module arranged to display indicia, or broadcast data, representative of or indicating one or more predetermined criteria for selecting a subset of the stored user account object data; a forth module arranged to collect data representative of, or indicating, the subset of the stored user account object data based on the one or more predetermined criteria for selecting the subset of the stored user account object data that were input or modified during prior access to and control over the one or more user account(s) or associated social network site user account(s) that at some prior time had permission to edit data in, or append data to, the user account object data of the one or more user account(s); and a fifth module arranged to transmit instructions to prevent display of the subset of the stored user account object data at (optionaly, every and/or user-selected) user account terminal(s) in the social network site computer network, according to the collected data representative of, or indicating, the one or more predetermined criteria for selecting the subset of the stored user account object data, from the terminal to the at least one remote computer(s); wherein the instructions are calculated to prevent display of the selected subset of the stored user account object data at at least one user account terminal of the social network site computer network, based on the one or more predetermined criteria.

Additional or alternative aspects of the disclosure are found in the appended claims. Further aspects, embodiments, features, and advantages of the embodiments, as well as the structure and operation of various embodiments are described in detail below with reference to accompanying drawings.

BRIEF DESCRIPTION OF THE DRAWINGS

In the accompanying drawings, which form a part of the specification and are to be read in conjunction therewith, and in which like reference numerals are used to indicate like features in the various views.

DETAILED DESCRIPTION

Figure 1:
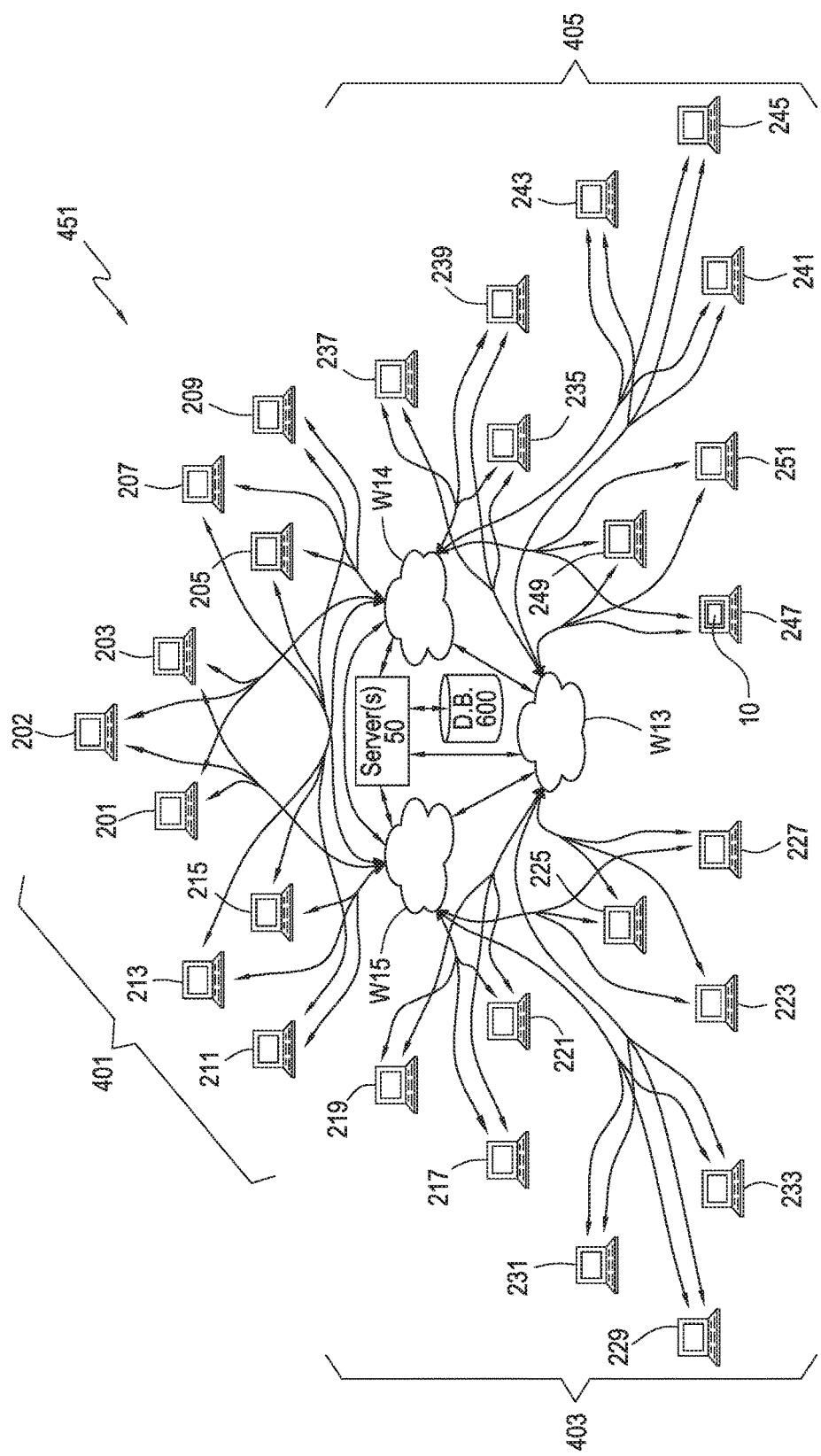
FIG. 1 is a schematic diagram of three exemplary digitally stored and operated social network site computer network environments, in which embodiments may be implemented.

Embodiments of the disclosure are concerned with the calculation of one or more data set transformation instructions, in certain cases the transmission of those instructions to at least one remote computer(s) (e.g., but not limited to, any combination of one or more of, a bank of, and geographically disparate communicatively connected, server(s) that manipulate user data). Ultimately, though not in certain method, terminal, system and computer-readable media embodiments, these instructions may or may not also be executed at one or more server(s), storage device(s) or other computer hardware holding or capable of selectively preventing display of the data set(s) being operated on.

The data available for viewing on a user account terminal of a social network site computer network are reduced by one or more of deleting data from one or more storage devices or data structures, restricting data transmission through the network, disabling receipt of transmitted data, and non-legible display or data to one or more user account terminals in the social network site computer network.

Though un-expectantly, it becomes apparent that data security and technological leveraging seemingly cannot coexist, creating a technically derived tension. For example, the social network website, Facebook® boasts about 829 million daily active users. Every day, these users upload more than 4.75 billion items of content (e.g., status updates, wall posts, photos, videos, comments, tags and other metadata), 'like' more than 4.5 billion items, and send more than 10 billion messages,—contributing to the 600 terabytes of data collected by Facebook® every day. This unprecedented deluge of information revelation can be attributed to the technical efficiencies provided by its particular digital interaction platform. Other social network sites present similar challenges, including but not limited to Twitter®, LinkedIn®, Instagram®, Snapchat®, etc.

It is also realized un-expectantly that, yet, because the advantage of widespread identity revelations require an audience, leveraging the technical advances necessarily means relationships, which are impossible without others— sometimes others who on a wide-scale network at some point tend to misuse or compromise such data.

In embodiments, certain of the below-indicated non-limiting technical advantages and/or others, each of which depend upon what particular combination of features disclosed herein is found in an embodiment, are realized only upon persistent and arduous study through both (a) discovering the very existence of the above-indicated technical tension, and (b) inventing the technical solutions disclosed in part herein.

In embodiments, resulting deletion, non-transmission, non-receipt, or non-legible display, and/or non-display of user-designated private or personal data thereby frees up processing resources both at an individual level such as at a terminal, and all the more so collectively, across even a global network of data storage and processing infrastructure facilitating the ebb and flow of personal and business related data of millions, if not even billions, of social network site users. These embodiments quite un-expectantly provide the unpredictable result(s) of reducing unwanted, unnecessary, and privacy-compromising data flow to and from various terminals and other computers communicatively connected to one or more digitally stored and operated social network site(s).

In embodiments, operations by which data set transformations are made improve data security by preserving or reclaiming the privacy of certain user account data objects.

In embodiments, operations by which data set transformations are made increase system operational efficiency at each terminal.

In embodiments, operations by which data set transformations are made strike an optimal balance between improving data security by preserving or reclaiming the privacy of certain user account data objects on the one hand, and increasing system operational efficiency, on the other hand, all the while allowing continued data exchange and aggregation between one or more user computers communicatively connected to at least one digitally stored and operated social network site.

In embodiments, the outcomes (alternately or additionally) affect quite unpredictable technical advantages of continued connectivity to one or more such sites (full utilization of these sites' own inherent communication and data transfer efficiencies), while reducing the computing time and energy required to receive individual or step-by-step implementations of merely small batch instructions to remove or otherwise secure relatively very little user account information.

The following describes a system for managing social networking site computer network data, according to embodiments illustrated in FIGS. 1-5. FIG. 1 is a diagram of computer network 451 including three exemplary environments, in which embodiments may be implemented. While the following is described in terms of FIG. 1, the embodiments are not limited to the environment(s) illustrated in FIG. 1. For example, any system having generally the structure of FIG. 1, or that would benefit from the operation, methods and functions as described herein may be used.

In exemplary embodiments, system 451 shows terminal clients 201-251 each or collectively comprising one or more browser(s) 10 of terminal 247 (browser also in each of other terminals, but not shown), which is/are used to connect to server(s) 500 over one or more networks W13, W14, and W15.

According to embodiments, browser 10 may include any device, application or module that enables a user or computer to navigate and/or retrieve data from another data source, typically over a network. Browser 10 may include any conventional web browser such as those that are widely available. According to further embodiments, browser 10 may also be configured to use any number of protocols, known now or developed in the future, including protocols such as HTTP, FTP, and underlying protocols such as TCP/IP or UDP. In embodiments, browser 10 is configured to run (or execute) web applications without a GUI as a headless browser. Web applications are applications that can be hosted within a web browser or those that can be accessed, for example, over a network such as the Internet or an intranet.

Browser 10 can further communicate with an input (not shown) to allow a user to input data, to input commands, or to provide other control information to browser 10. Browser 10 may request content from one or more server(s) 50, based on prior user input that is stored at one or more terminal(s) or server(s) 50 before accessing server(s) 50, and upon which instructions later sent to server 50 are calculated. Server(s) 50 may respond to the request by providing content back to browser 10 and client 201 via network W13. Browser 10 may also be configured to retrieve content from server(s) 50 without user intervention.

In embodiments, network(s) W13, W14, and W15 can be any type of data network or combination of data networks including, but not limited to, a local area network (LAN) accessed locally or remotely such as via a VPN, a medium area network, or a wide area network such as the Internet. Network W13, for example, can be a wired or wireless network that allows client 247 and server(s) 50 to communicate with each other. Network W13 can further support world-wide-web (e.g., Internet) protocols and services.

Server(s) 50 provides content (e.g., web pages, applications (or "apps"), audio, video, etc.) that can be retrieved by client 247 over network W13. Content retrieved by client 247 can be disseminated via browser 10. In various embodiments, server(s) 50 and/or browser 10 includes one or more features of content manager 200, which is described further below.

As illustrated in FIG. 1, in embodiments, terminal and/or system data flow configurations selectively delete (or otherwise prevent(s) legible display of) user account data with an unexpected technical efficiency not previously seen, in view of the above seemingly irreconcilable tensions. A base functional component of one aspect of the disclosure is composed of at least one of a plurality of terminals 201 to 251, configured to be ordered by predetermined default settings or user-selected settings and/or software instructions into one or more dynamically changing and rearranging user terminal groupings. Certain network terminals and/or systems, e.g., system 451, connect and allow exchange of information between local or far flung terminals within and from at least, but not limited to, three distinct types of networks W13, W14, and W15.

In embodiments, terminal group 401 comprises terminals 201 to 215, terminal group 403 comprises terminals 217 to 233, and terminal group 405 comprises terminals 235 to 251, each group and collective groups illustrating flow of data, albeit on a very small scale, among and across varied networks, such as clear network W13, darknet or darkweb W14 (e.g., employed via The Onion Router (Tor)), and peer-to-peer network W15 via at least one (or more) server(s) 50. Server(s) 50 receive, store, retrieve and deliver, across and at numerous and geographically disparate locations, user account data on one or more databases 600.

In embodiments, terminal and system operations may or may not in whole or in part be effectuated, executed, or implemented on or via clear network W13 (comprising at least all of, or just a portion of, terminal groups 403 and 405) whereby individual terminals, server(s) 50, or a combination thereof, calculate the actions to be taken on respective data sets, and propagate(s) those actions out to the network via server(s) 50 and beyond to all other users.

In embodiments, terminal and system operations may or may not in whole or in part effectuated, executed, or implemented on or via dark net W14 (comprising at least all of, or just a portion of, terminal groups 401 and 405) whereby individual terminals, server(s) 50, or a combination thereof calculate the actions to be taken on respective data sets, and propagate(s) those actions out to the network via server(s) 50 and beyond to all other users.

In embodiments, terminal and system operations may or may not in whole or in part effectuated, executed, or implemented on or via a peer to peer network W15 (comprising at least all of, or just a portion of, terminal groups 401 and 403) whereby one or more terminals, server(s) 50, or a combination thereof, calculate the actions to be taken on respective data sets, and propagate(s) those actions out to the network.

In embodiments, server(s) 50 execute instructions for user account data deletion after a retention period—and not immediately upon server(s) 50 receiving the instructions to delete certain data from one or more terminals, and/or not immediately upon terminal(s) receiving the instructions to delete certain data at one or more terminals.

In embodiments, at least one of terminals 201 to 251 transmit instructions to server(s) 50 to execute instructions causing successful deletion of associated user account object data from database(s) 600. In turn, associated account terminals, such as used by "friends" on Facebook®, may (or may not) receive alerting data indicating the effectiveness of one or more of the herein disclosed embodiments, thereby creating an acceleration and scaling of at least several of the technical advantages of various herein disclosed embodiments.

In embodiments, each terminal may or may not be geographically remote from or local to the computers that access and control the storage devices on which social network site user data are stored.

In embodiments, each terminal may or may not be part of one or more device set(s), the one or more device set(s) that may or may not comprising only one or multiple-single user, entity (e.g., informal group) or participant—controlled, owned or used device(s).

In embodiments, any one or more of these terminal(s) or device set(s) may or may not include for example remote log-on and/or remote usage via any Web-capable device to a Web-based ASP or peer-to-peer decentralized network even though device ownership, possession and/or control is only temporary and/or through established via other-user-owned or installed applications, such as by embedded or remote implementation via a widely used social media site application or website.

In embodiments, client terminal 247 and server 50 can each be implemented on a computing device. Such a computing device includes, but is not limited to, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, and hardware. The computing device may also have multiple processors and multiple shared or separate memory components. Software may include one or more applications and an operating system. Hardware can include, but is not limited to, a processor, memory and graphical user interface display. An optional input device, such as a mouse or touch screen, may be used.

Software Modules

Figure 2:
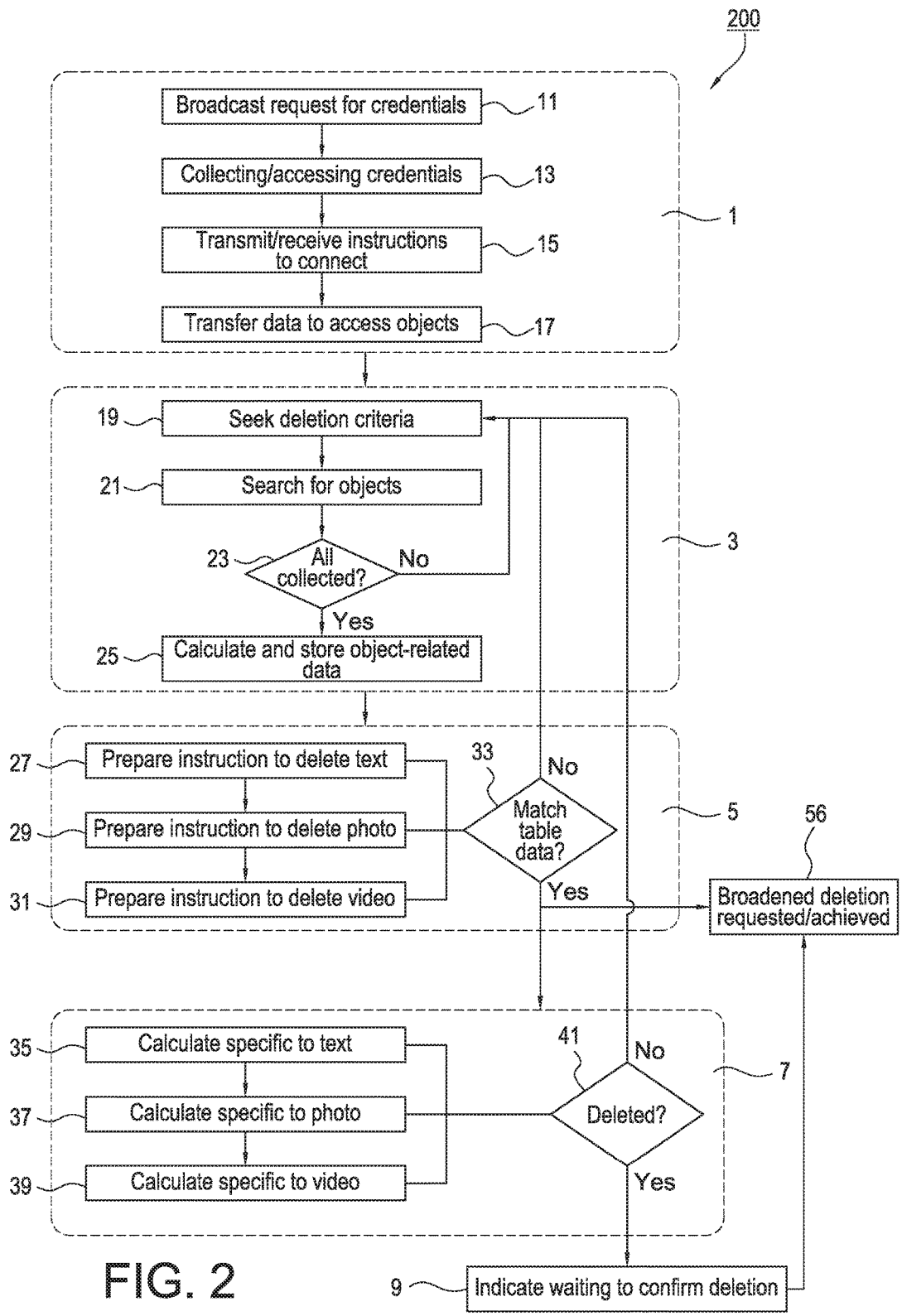
FIG. 2 is a diagram of software components, according to an embodiment.

FIG. 2 illustrates content manager 200, according to embodiments. Content manager 200 may include one or more modules 1, 3, 5, and 7. The term "module" as used herein shall mean software, such as instructions or code, but not hardware, such as a semiconductor hardwired logic circuit in a processor.

Content manager 200 enables embodiments to delete (or otherwise prevent display of) server 50 and/or database 600 content selections. In embodiments, content manager 200 can be implemented in server 50 (e.g., as a server side component). In other embodiments, content manager 200 can be implemented in browser 10. In yet other embodiments, content manager 200 can be implemented in both server 50 and browser 10. As shown in FIG. 2, content manager 200 may or may not include, access module 1, deletion indicia collection module 3, deletion module 5, and calculation module 7.

In embodiments, access module 1 optionally includes displaying or broadcasting a request for credentials to access a social network site user account 11. It then may include accessing and/or collecting data representing the account or accounts such as credentials 13. It may also include transmitting or receiving instructions to create a communication link between the relevant social network owned, controlled and/or operated servers and/or social network site owned, controlled or operated databases on which a social network site stores user data on one hand, and a terminal used to access the site on the other hand, in accordance with an embodiment herein disclosed 15. It may also include communication and data transfer to access both objects uploaded to the social network site by a user and/or friends, or one or more users associated by the site to the account user 17.

In embodiments, the displaying, broadcasting and or transmitting instructions to obtain or access user account credentials may be made from any one or more of an account user operated and/or controlled terminal, a third party operated and/or controlled terminal, and a social network site operated and controlled terminal or server(s).

As used herein, display or displaying are respectively a type of broadcast or a type of broadcasting, and broadcast and broadcasting each include any digital data signal transduction into one or more readily-understandable-by-human form, and which may be limited to broadcast by only one device or more than one device.

In embodiments, indicia collection module 3 includes display or broadcast of indicia or data that seek entry of what type of criteria are to be used to determine what account object data are to be deleted 19. It may then include collecting or searching for object data that meet the criteria selected 21. It may then determine whether all such data are collected by verifying through a secondary search on a webserver portal such as Google® and comparing the collected data with what is found in the secondary search 23. If not, the request for what type of data is to be deleted 19 and the search and collection 21 are performed again. Once no additional secondary (or subsequent) search object data are found or identified, the results of the items in terms of their type identity, upload and/or storage-date marking, size, and/or total number of items, may be calculated and/or stored in a data structure, such as in a table in a store at the terminal (or local to the data and/or under the control of the social network site operators) 25.

In embodiments, deletion (or display prevention) module 5 may include preparing instructions to delete (or prevent display of) data including, but not necessarily limited to, all text objects defined according to the deletion (or display prevention) criteria 27, all photographic objects defined according to the deletion criteria 29 and all video objects defined according to the deletion criteria 31. Module 5 may determine if all objects previously and optionally stored in, for example, a terminal data structure table are identified in the transmitted instructions 33, and if not, another request for the desired deletion criteria is solicited 19 to confirm what objects are to be deleted, followed by reprocessing. If all stored objects types or identities are accounted for, deletion module 5 may e.g., then transmit the requests to delete, and display that requests to delete the objects have been transmitted 56, or continue to further optionally to calculate what objects to delete in accordance with the specific requirements of the social network site to delete at least one copy of the selected objects In embodiments, the selection criteria may also and/or alternately include (any one or more of) whether whoever operates or controls another user account or computer of the social network site computer network has, had, or might in the future have, a certain relationship status. A certain relationship may or may not include, but is not limited to, friendship, courtship, and business, between the social network site account holder and an associated (or unassociated) social site network account holder. These criteria may be implemented by causing one or more of server(s) 50 to execute instructions that prevent the display of a user's account object data on one or more computers operated or controlled by a specific (or group of) person(s) with whom the user is/was/or will be in a special relationship. This result may be accomplished for example by instructions defining who has (via user account) and who does not (via user account) have permissions to view some or all of a user's object data.

Numerous other selection criteria are envisioned, and may also include, but are not limited to, e.g., whether the one or more other social network site computer network computer(s) is controlled or operated by a user or users presently having, or at any time having, one or more of the following status: any particular type of relational status, a particular name, a personal ID, a user with whom the terminal user has had lapses in times (or data volume) between communication(s), co-workers in a same organization or at a same workplace, or any other aspect of a user's profile, such as but not limited to hair color, residential location, nationality, whether the user likes one or more of the same interests or activities another user, age, gender, if in school, if under 18, if in a close friendship with a third-party user, whether the user e.g., smokes (or engages in any other type of activity) or e.g., discusses smoking (or discusses any other type of activity or topic). Other criteria may or may not include, but is not limited to, popularity of user data (a company or personal user may wish to delete or selectively show on a user-by-user basis, unpopular or popular content data), demographics (a company or personal user may wish to adjust its target audience, perhaps based on popularity), any location associated with the user object data, any users associated with the user object data.

In embodiments, calculation module 7 may include specific calculations in accordance with specific API and other requirements particular to each social network site computer network, which may vary over time, vary from object to object, vary from object type to object type, vary from O/S to O/S, and/or vary from account user to account user. These calculations may include, for example, separate determinations for text 35, photographs 37, and videos 39. The required calculation(s) (such as a particular set of instructions) may be available only internally to the operators of the social network site, to account users, and/or to the public at large, for example.

In embodiments, calculation module 7 may for example cause a terminal(s), upon failure to remove one or more data object(s), to report the failure to one or more update computer(s) (either operated and/or controlled by or not operated and/or controlled by those who operate and/or control the social network site), e.g., but not limited to one or more of Google® Analytics server(s). These failure results may be one or more of digitally corrected by widely broadcasting update(s) (e.g., pushing out a revised version of instructions) such as to non-limiting content manager 300 below. User notification(s) of the update(s) may or may not occur in either foreground or background embodiments.

In particular embodiments, where a social network site computer network server or database data undergo change(s), e.g., in one or more data structures, thereby causing failure(s), instructions from one or more terminal(s) cause broadcasting of report of the failure to one or more of (1) other use terminal(s) and (2) the one or more update computer(s), either (a) on the social network site computer network or (b) interfacing with one or more computers that are one or more of never, previously, currently, and subsequently, on the social network computer network. In embodiments, update instructions transmitted by the one or more update computer(s) may be broadcast via, e.g., but not limited to, Google® Play and Apple® App Store.

For example, in one or more of both foreground and background mode(s), when a calculating module or other module(s) encounter(s) one or more change to Facebook®'s website that prevents execution of data deletion or other instruction, one or more error description(s) of the problem(s) is/are transmitted to one or more update server.

Such description(s) may include, but need not include nor be limited to include, transmission of metadata such as regarding date, time, application version number for a particular terminal O/S (e.g., Android or iOS) and/or level or type of service.

For example, instructions to perform a task of one or more module from the terminal(s) have corresponding specific instructions that may or may not vary from, that may or may not depend on, and/or that may or may not be based on, one or more metadata characteristic(s), such as the O/S or other characteristics of each terminal or set of terminals found in a current or prior report associated with that terminal(s). These variances and characteristics for example may or may not include, when a terminal transmits instructions requesting action at Facebook® servers, those instructions/request(s) may be based on an expectation that the request should contain certain pieces of information to have an intended effect.

In particular non-limiting embodiments, instructions may or may not include determining whether the expected one or more piece(s) of information are present in the instructions. If so, then instructions proceed. If not, at least one error report is calculated and/or transmitted from the terminal(s) that fail to send (directly or indirectly) successful instructions, to the update computer(s).

In embodiments, if determining whether the expected one or more piece(s) of information are not present in the instructions, at least one error report is calculated and/or transmitted from a computer(s) other than the terminal(s) that fail to send (directly or indirectly) successful instructions (e.g., from computer(s) on which one or more of text, terminal model and/or O/S-specific features of error report, etc., are stored), to the update computer(s). Where many common sets of terminal instructions—for example, regarding massive numbers of data objects deleted according to instructions from the same or like-featured phone or O/S-specific web application—confront the same basic failures for the same basic reasons; having such designated first party, second party or third party servers will help allow scaling.

In embodiments, instructions, e.g. to connect to or select data from a general or specific data structure of Facebook®'s server or database, that do not receive a response or otherwise fail (after analysing a response to request access or data), cause further instructions to transmit an error report. In embodiments, problem description(s) and/or reports may be in part or in whole, pre-defined and pre-stored based on any one or more of (but not limited to), pre-defined message(s) describing the problem, filename(s) containing the instruction(s) that led to the error(s), and the line number(s) in the filename containing the instruction(s) that led to the error(s). If an error arises, then the module(s) may or may not proceed.

In foreground or background mode embodiments, the terminal(s) may present a terminal user(s) with the message "This app is currently unavailable." In alternate foreground or background mode embodiments, terminal(s) may or may not ignore some errors and reschedule the task for a later time, until one or module instructions are patched before a next run (see below).

In embodiments, when an update computer(s) (e.g., Google® Analytics) receives an error report from a user terminal(s), the update computer(s) sends the report(s) to another terminal(s) (optionally one or more of never, previously, currently and subsequently) on the social network site computer network, indicating the error(s) and/or source of the error(s). This error report(s) is then used to identify one or more of the precise module instruction(s) that fail to work. One or more module may or may not be updated by one or more module that recalculate instructions to create patch or new module instructions, which are distributed to user terminal(s), e.g. as a new version available (e.g., but not limited to, via Google® Play for Android or Apple® App Store).

In embodiments, a terminal's O/S will periodically check for app updates (e.g., via Google® Play or Apple® App Store) and may automatically download and install such updates. Hence, by creating and distributing new module version(s) to user terminal(s), terminal(s) include up-to-date versions of modules. It follows that many terminal users will never know that modules encountered a problem, because module(s) will be automatically or manually fixed before a user notices any failure.

In embodiments, one or more modules include at least one reporting mechanism instructions to manage statistics, e.g., a module reports how many statuses have been deleted, to Google® Analytics.

In alternate or additional embodiments, a terminal operating system automatically discovers the revised instructions transmitted due to the failure(s) and update the instructions on the terminal.

After (or as soon as) calculating module 7 instructions for one or more of connecting to, accessing or selecting data at, and deleting data from, a social network site server/database, are calculated and transmitted, a secondary search is made on the social network site, either immediately or at a time appropriate to account for any time delay caused by a particular social network site in deleting objects, to verify whether each object is deleted 41. If not, the process begins again with any aspect of indicia collection module 3. If so, a message to broadcast to the user to indicate any expected time delay, as necessary 9.

Once complete deletion is independently verified, a message is displayed or otherwise broadcast to indicate successful object deletion 56. In alternate embodiments, partial success, and for example, object by object reporting may be broadcast to a user.

In embodiments, any one or more of the modules above or other modules in accordance with other embodiments, may alternately be replaced by individual means for performing one or more functions of the modules, steps, and individual features disclosed herein.

In embodiments, execution of the instructions at server(s) 50 or database 600, any of which can be located anywhere in the world, may occur according to, e.g., the times at which such requests are sent, according to the bandwidth and transmission speed of the network pathway to server(s) 50 and then database 600, and according to the distance(s) to and between a terminal on one hand, and server(s) 50 and database 600 on the other, for example, and according to the maximum number of parallel requests that a terminal is capable of sending at the same time. As a result the speed at which instructions are ultimately executed can vary greatly, from even nanoseconds, to minutes, or even to hours or days and longer.

In embodiments, transmissions of instructions may be instantaneous via, e.g., but not limited to, sending multiple requests in parallel, wherein each set of requests is sent after a regular or irregular time interval. The number of parallel requests may be any integer in the following progression from 0 to 1 or up to 1000s in parallel (i.e., 1, 2, 3, 4, 5, 6, 7, ... 25 ... 100 ... 200, 201, ... up to 10000 or more).

In embodiments, one or more random number generator(s) may or may not be used to determine when to transmit instructions and the number of commands to send in parallel at a particular time (as limited in whole or in part by the terminal from which the instructions are sent).

In embodiments, instructions sent to server(s) 50 and database 600 may be calculated to obscure the fingerprint of a terminal that is being used. In addition, or alternately, instructions may be calculated to vary the speed and number of requests to delete (or otherwise prevent display of) data sent by the terminal or received by server(s) 50 and database 600, such as by randomizing the speed of the time at which permission prevention is effectuated, or randomizing the speed at which sequential data deletion occurs.

In embodiments, instructions sent to server(s) 50 and database 600 may be calculated to overcome attempts to block mass or speedy deletion (or prevention of legible or other display) by, e.g., prompting a user to fill out a CAPTHA (or other human-indentifying proof submission requirement).

In embodiments, instructions sent to server(s) 50 and database 600 may be calculated to overcome attempts to examine an amount of data deleted from or operated on, for a particular user account. For example, in instances where a social network site computer network provides an API that allows automation for some functions, but not for user personal data deletion, this feature counters a de facto violation of a user's desire to maintain personal data privacy and thereby promotes personal data information security.

In embodiments, objects are deleted (or otherwise prevented from being displayed) based on how long ago they are posted to an account. The terminal displays an adjustable object retention selection period. For instance, it can be variously extended as recently as one day, and as far back in time as 10 or even 20 years, though any time in years, months, days may be selected. Selection and setting of the retention time affects what objects are deleted, such that all objects or all objects of a certain type are subjected to deletion when an instruction to delete objects is transmitted to the at least one remote or local servers or storage devices on which the objects are stored.

Non-limiting examples of object data that may be deleted include account user status text, videos, photographs, and URLs originally self-uploaded by an account user to an individual user account (which may or may not be reported to other user accounts), and account user-identifying tags that are associated with photographic or video content. Non-limiting specific examples are one or more of photographs and/or accompanying text object(s); videos and/or accompanying text object(s); URLs and/or accompanying text object(s); self-posted comments and other user comments on status text objects, videos, photographs, and URLs.

In embodiments, after objects are deleted instructions may be transmitted to search for the deleted object(s) either individually, immediately after its deletion is instructed, or only after all objects in the selected subset are deleted. In accordance with whether an object is found, a notification is displayed or broadcast, accounting for each undeleted and/or deleted object is, either collectively or individually (on an object-by-object basis).

Figure 3:
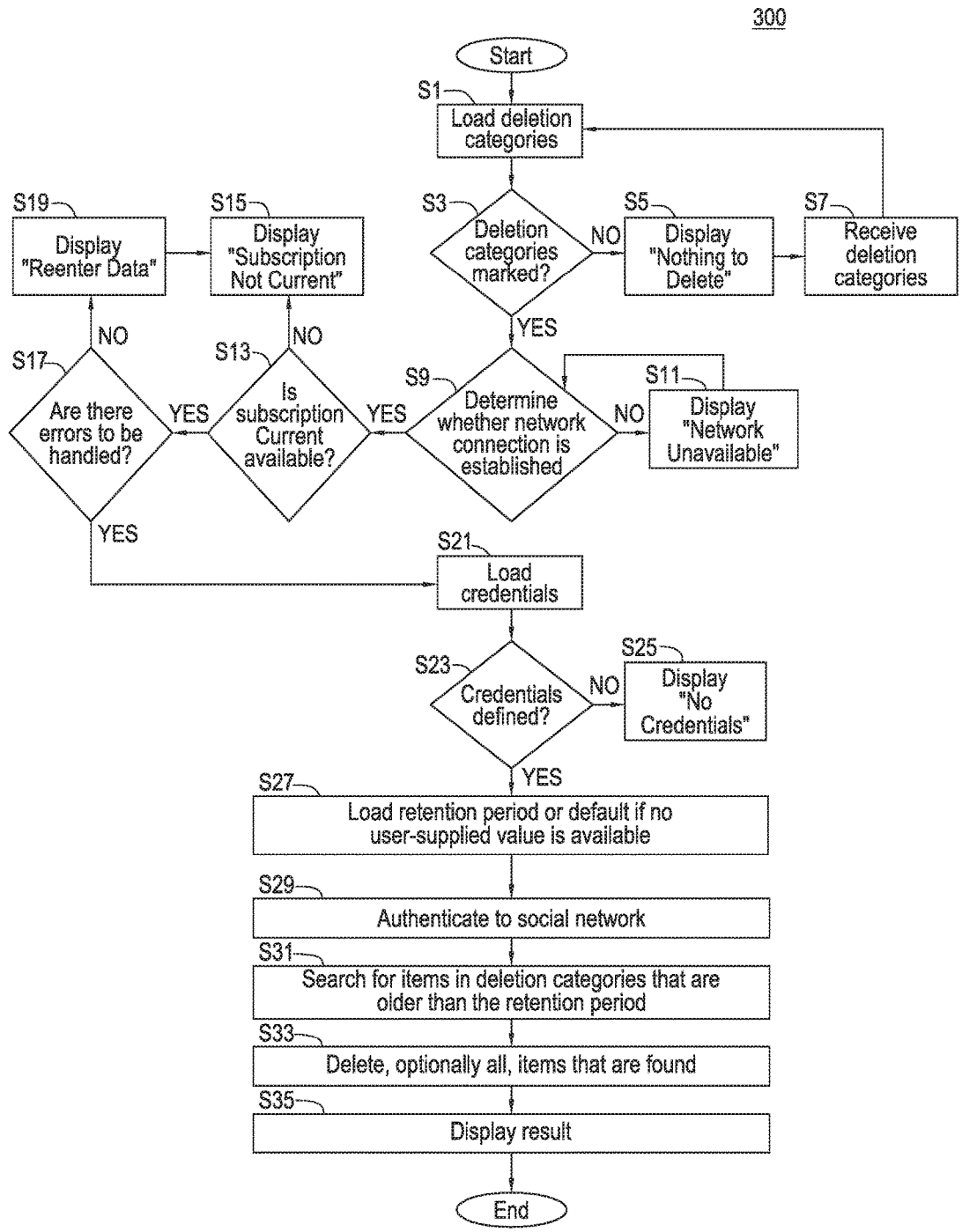
FIG. 3 is a flow diagram showing an exemplary overall operation, according to an embodiment.

FIG. 3 illustrates method 300, which is an exemplary overall operation of content manager 200, according to embodiments in one or more terminal (or alternately in one or more server, or in any combination thereof). The following workflow can, for example, be instantiated solely or collectively by any combination of instructions from one or more of an app GUI, and the terminal's O/S (as a background process). In embodiments, categories of object data to be deleted are loaded from a storage device (step 1), if previously stored. (At first or subsequent installation of content manager 200 the steps of method 300, username and password or other social network site credentials may be previously obtained and stored in the terminal or a remote store, for example before a terminal is disconnected and reconnected to the social network site computer network). Whether deletion categories are marked or selected is determined (step 3). If not, the terminal displays or otherwise broadcasts that no items are marked for deletion (step 5). Then, the terminal receives input of data that indicate or select what categories of data are to be deleted. (step 7), and such categories are again loaded or otherwise accessed.

If the deletion categories (and/or non-default retention period) are successfully accessed, whether a network connection is established is determined (step 9). If no network connected is established, the terminal displays or otherwise broadcasts that the network is unavailable (step 11) and optionally continues to determine whether the network connection is established, until it is established.

After (or as soon as) a network connection is established, method 300 determines whether a user subscription is current and available (step 13). If not, then the terminal displays or otherwise broadcasts that the subscription is not current (step 15) and the method waits to proceed until the subscription is up-to-date in payment and having valid standing and or updates.

If the application subscription is current and valid, the method determines if errors are to be handled (step 17) and if so the terminal displays or otherwise broadcasts instructions to re-enter relevant missing or incorrect information (step 19). These and other error determination(s) may alternately be performed at any one or more earlier or later stage(s), be variously repeated, and/or be split into various types and performed separately or concurrently at once or at various stages and in various orders.

In embodiments, error handling may alternately or additionally include, optionally at any terminal user's option, reporting to a server information such as metadata about batch or specific object data related failed connections or tasks regarding any one or more of the steps (or features of steps) undertaken by method 300.

In embodiments, though not required in the same sequence as method 300, access to a social network site user account is initiated (step 21), either by acquiring social network site access (such as, but not limited to, login user name and password) credentials at a GUI or by accessing preloaded or pre-stored access credentials from a store (located in the terminal or from an external device such as a remote store).

Method 300 then determines whether the credentials are defined, i.e. are stored as a set of user credentials associated with content manager 200 or the subscription (step 23). If not, the terminal displays or otherwise broadcasts that no credentials are found, entered or exist (step 25). If so, the retention period defined by the user and stored in the terminal or elsewhere are loaded, or a default retention period is loaded if no user-supplied value is stored, accessed or retrieved (step 27)

In embodiments, social network site access credentials are transmitted to servers or databases on which access permission may be granted, to authenticate and establish digital communication connection with the social network site server(s) (step 29). This step (and/or other steps) may be performed directly from one terminal to a server or indirectly from a terminal to several other terminals or servers. In embodiments, method 300 sends requests that search for items not dated within the designated retention period (step 31). In embodiments, found objects that fall outside of the retention period are deleted from the store, such as database 600, on which they are stored (step 33).

Steps 29, 31, and 33 differ depending on each social network site accessed and managed. In an exemplary method regarding a Facebook® account, a headless browser performs step 29. Then, the method searches for the designated or selected objects using either Facebook®'s API or headless browsing. Finally, headless browsing is used to delete items identified in the search. The precise way in which objects are deleted will depend upon the object type, e.g., deletion of a user name photograph tag will differ from status update texts on Facebook®.

In embodiments, method 300 includes causing the terminal to display or otherwise broadcast results of the prior steps (step 35).

In embodiments, the sequence of the above steps may be altered as suitable to achieve any one or more of the functionality and effects indicated herein. For example, collection of access information such as login credentials may occur intermittently between instructions being sent to server 50 (or database 600 if via a LAN).

In embodiments, various steps and various combinations of features of steps of content manager 200 may be running in the same or different sequences, either in the foreground or background. If, for example, running in the foreground, all feedback is provided directly to a user via the content manager's 200 GUI as data are deleted, for example on an object-by-object basis. When content manager 200 is running in the background, all feedback is provided via a phone or PC O/S, for example after all data within a manually set expiration date are deleted.

In embodiments, more (or less) detailed feedback may be provided in the foreground mode, because a GUI provides a relatively higher (or lower)-bandwidth channel By comparison, feedback may be more limited (or less limited) in background mode, because an O/S provides a relatively lower (or higher)-bandwidth information channel (e.g., limiting display of results and updates to one to a few lines of text).

System and Digital Communications Network Hardware

Figure 4:
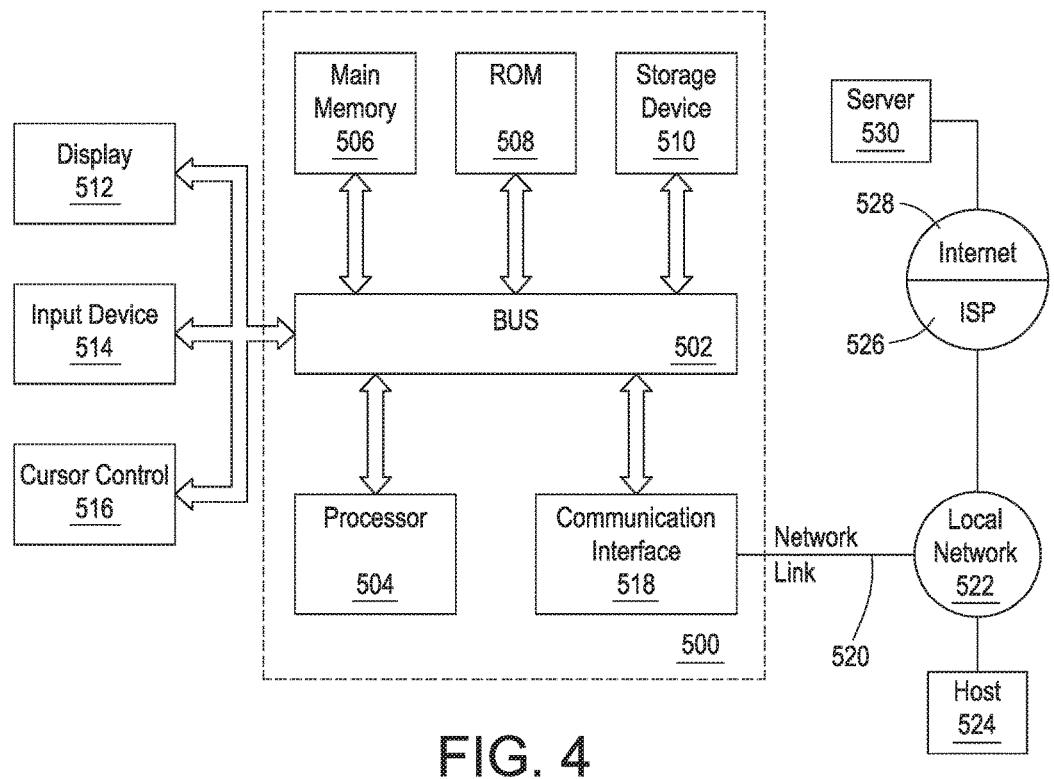
FIG. 4 illustrates an example computer useful for implementing components of the embodiments, along with several network features that may be used in embodiments.

Another aspect of the disclosure is a computer system. Referring to FIG. 4 and according to at least one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to at least one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process operations described herein. In alternative embodiments, hard-wired circuitry may be used in place of or in combination with software instructions.

The terms "storage media" and "storage device" as used herein refer to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media and storage device are distinct from but may be used in conjunction with transmission media. Transmission media participates in transferring information between storage media/devices. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In at least one such implementation, communication interface 518 sends and receives one or more of electrical, electromagnetic and optical signals (as with all uses of "one or more" herein implicitly including any combination of one or more of these) that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In at least one embodiment of the Internet example, a server 530 might transmit a requested code for an application program through Internet 528, ISP 526, local network 522 and communication interface 518.

In embodiments, the received code may be one or more of executed by processor 504 as it is received, and/or stored in storage device 510, or other non-volatile storage for later execution.

Figure 5:
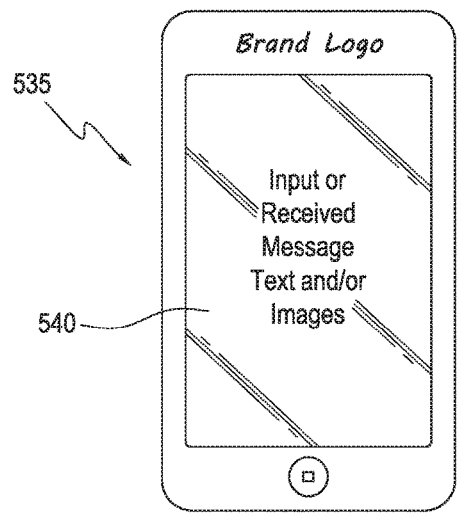
FIG. 5 illustrates an exemplary embodiment of the computer of FIG. 4 in a mobile terminal.

Now referring to FIG. 5, in at least one embodiment a device used in accordance with this disclosure is or comprises mobile display or touch screen input smart phone or tablet 535, which is shown displaying direct user-to-device input message text and or image(s), or remotely received message text and/or image(s) 540.

Computer-Readable Medium

Another aspect of the disclosure is one or more computer-readable media (or computer storage apparatus) having a program, which when executed by one or more processors, such part of one or more of the systems described herein, causes the one or more processors to enable, allow or cause devices to perform any one of the methods as variously comprising any one or more of its various embodiments or sub-embodiments described above or otherwise covered by the appended claims.

In embodiments, the one or more computer-readable media are non-transitory media such as, but not limited to HDD and SSD disk drives, thumb and other flash drives, DVDs, CDs, various static and dynamic storage devices and other numerous storage media.

In embodiments, the one or more computer-readable media comprise or are one or more transitory electronic signals.

The following numbered clauses set forth various embodiments of the disclosure:

1. At least one
   (a) computer-implemented method,
   (b) (optionally, one or more of (i) personal, (ii) not-user-controlled, (iii) not-user-operated, (iv) user-controlled and (v) user-operated) terminal by way of (i) at least one processor; and at least one memory storing instructions that, when executed by the at least one processor, causing the at least one processor to, (ii) means or (iii) software module(s) for performing operation(s),
   (c) system by way of (i) at least one processor; and at least one memory storing instructions that, when executed by the at least one processor, causing the at least one processor to, (ii) means or (iii) software module(s) for performing operations(s), or
   (d) transitory or non-transitory computer-readable medium (or alternately also herein throughout, computer storage apparatus) containing instructions which when executed by one or more computers each or collectively comprising one or more processors cause operation(s), according to any one of the preceding clauses, the operation(s) comprising:
   collecting or accessing data uniquely representative of, or uniquely indicating, one or more digitally stored and operated social network site user account(s) and transmitting data necessary to access and control the one or more digitally stored and operated social network site user account(s) to at least one remote (or local) computer(s);

2. A method, terminal, system or, transitory or non-transitory computer-readable medium according to any one of the preceding clauses, further comprising displaying indicia, broadcasting data, or transmitting instructions, to solicit collection of or to access data uniquely representative of, or uniquely indicating, one or more digitally stored and operated social network site user account(s);

3. A method, terminal, system or, transitory or non-transitory computer-readable medium according to any one of the preceding clauses, further comprising establishing direct or indirect communication access and linkage between the terminal and at least one remote (or local, optionally for any and/or all instances herein) computer(s) on which are stored, or by which access is available to control (e.g., delete), stored user account object data that were input or modified during prior access to and control over:
   the one or more social network site user account(s) or
   associated social network site user account(s) that at some prior time had permission to edit data in, or append data to, the stored user account object data of the one or more social network site user account(s),
the stored user account data of the one or more user account(s) uniquely accessible based on access data digitally pre-assigned only to the one or more social network site user account(s);

4. A method, terminal, system or, transitory or non-transitory computer-readable medium according to any one of the preceding clauses, further comprising displaying indicia, or broadcasting data, representative of or indicating one or more predetermined criteria for selecting a strict or proper subset (or optionally, non-strict and non-proper subset) of the stored user account object data;

5. A method, terminal, system or, transitory or non-transitory computer-readable medium according to any one of the preceding clauses, further comprising collecting data, representative of, or indicating, (optionally only, as with respect to the user account object data) the subset of the stored user account object data based on the one or more (optionally, one or more of user-defined and predetermined) criteria for selecting the subset of the stored user account object data that were input or modified during prior access to and control over the one or more user account(s) or associated social network site user account(s) that at some prior time had permission to edit data in, or append data to, the user account object data of the one or more user account(s);

6. A method, terminal, system or, transitory or non-transitory computer-readable medium according to any one of the preceding clauses, further comprising transmitting instructions to delete or otherwise prevent legible display of (optionally only or optionally only for one or more of certain types of object data such as certain types of one or more of text, video, and photographic object data items, or only from one or more of certain data sources, user accounts, and user account data profile(s)) the subset of the stored user account object data, according to the collected data representative of, or indicating, the one or more (predetermined and/or pre-stored on one or more of the at least one remote or local computer and the terminal or terminals) criteria for selecting the subset of the stored user account object data, from the terminal to the at least one remote computer(s)

7. A method, terminal, system or, transitory or non-transitory computer-readable medium according to any one of the preceding clauses, wherein the instructions are calculated to cause the at least one remote computer(s) on which are stored, or by which access is available to control (e.g., delete), the stored user account object data, to, optionally in whole or in part, prevent display of (e.g., delete) the selected subset of the stored user account object data (optionally, from at least one database on which are stored the subset of the stored user account object data) at every (or all, most, about 10%, about 20%, about 30%, about 40%, about 50%, about 60%, about 70%, about 80%, about 90%, or about 100%, at any given time) user account terminal of the social network site computer network, based on the one or more predetermined criteria, the instructions including selection and deletion of at least one copy of all stored user account object data in the subset of the user account object data.

8. A method, terminal, system or, transitory or non-transitory computer-readable medium according to any one of the preceding clauses, wherein one or more of:
  (a) the instructions are transmitted at random intervals,
  (b) the instructions are transmitted in parallel; and
  (c) the collecting or accessing of data representative of, or indicating, the subset of the user account object data, is one or more of:
    (1) simultaneous in time with respect to each and every one of the objects in the subset,
    (2) performed at predetermined times based on at least one predetermined (and/or prestored) set of digital instructions, the at least one predetermined set being optionally pre-determined at a time prior to or at least before predetermination of the data representative of, or indicating, the display, broadcast or collection of data representative or indicating the predetermined criteria,
    (3) simultaneous or performed at predetermined times based on at least one predetermined set of digital instructions, optionally pre-determined at least before the data representative of, or indicating, the display, broadcast or collection of data representative or indicating the predetermined criteria;
    (4) simultaneous or performed at predetermined time(s) based on at least one predetermined set of digital instructions, the single or multiple times pre-determined at least before the data representative of, or indicating, the display, broadcast or collection of data representative or indicating the predetermined criteria;
    (5) simultaneous based on at least one predetermined set of digital instructions;
    (6) performed at predetermined time(s) based on at least one predetermined set of digital instructions;
    (7) instantaneous;
    (8) all completed before any of the instructions are transmitted;
    (9) repeated for at least two of the user account object data before any of the instructions are transmitted;
    (10) at least 10% completed before any of the instructions are transmitted;
    (11) at least 20% completed before any of the instructions are transmitted;
    (12) at least 30% completed before any of the instructions are transmitted;
    (13) at least 40% completed before any of the instructions are transmitted;
    (14) at least 50% completed before any of the instructions are transmitted;
    (15) at least 60% completed before any of the instructions are transmitted;
    (16) at least 70% completed before any of the instructions are transmitted;
    (17) at least 80% completed before any of the instructions are transmitted;
    (18) at least 90% completed before any of the instructions are transmitted;
    (19) in whole or in part completed followed by the instructions being transmitted in parallel;
    (20) in whole or in part completed followed by the instructions being transmitted at random intervals.

9. A method, terminal, system or, transitory or non-transitory computer-readable medium according to any one of the preceding clauses, wherein the at least one remote computer(s) are one or more of operated and controlled by a user or set of users other than the user or set of users of the terminal.

10. A method, terminal, system or, transitory or non-transitory computer-readable medium according to any one of the preceding clauses, further comprising storing the data representative of, or indicating, the one or more predetermined criteria for selecting the subset of the stored personal data.

11. A method, terminal, system or, transitory or non-transitory computer-readable medium according to any one of the preceding clauses, wherein the at least one remote computer(s) at one time (optionally which herein is defined to account for reasonable and normal tolerances in microprocessing speed, bus transmission (or other hardware; or optionally subject only to limitations specific to the social network site computer network after instructions are transmitted from the terminal) and intra-computer and/or intra-network speeds to execute all instructions for the selected objects) receive, forward to other of the at least one remote computers or database for execution, then execute, (or optionally initiate execution of), the instructions for all the objects in the selected subset.

12. A method, terminal, system or, transitory or non-transitory computer-readable medium according to any one of the preceding clauses, wherein the (optionally, one or more of not-user-controlled, not-user-operated, user-controlled and user-operated) terminal transmits, or initiates simultaneous or (optionally digitally predetermined) periodic transmission over a digitally predetermined time of, each and every instruction for all objects in the selected subset to the at least one remote computer(s).

13. A method, terminal, system or, transitory or non-transitory computer-readable medium according to any one of the preceding clauses, wherein the instructions to prevent display of (e.g., delete, not transmit, not receive, not legibly display) the selected subset are executed to delete each and every object of the selected subset, at a rate according to and limited only by the processing speed(s) and data transmission speed(s) of the at least one remote computer(s) and/or in the case of non-display, the processing speed(s) and data transmission speed(s) as between the at least one remote computers and other account user terminals.

14. A method, terminal, system or, transitory or non-transitory computer-readable medium according to any one of the preceding clauses, wherein the speed or speeds at which the at least one remote computer(s) store and initiate execution of, the instructions is/are limited only by the time(s) at which one or more of the at least one remote computers receive (or the single time or multiple times the terminal starts to process, or processes, all of) the instructions for the objects in the selected subset, and the time(s) between which the at least one remote computers receive (or the single time or multiple times the terminal starts to process, or processes, all of) the instructions for the objects in the selected subset and the time(s) when the at least one remote computers initiate (or the single time or multiple times the terminal starts or completes) execution of the instructions to delete the objects in the selected subset.

15. A method, terminal, system or, transitory or non-transitory computer-readable medium according to any one of the preceding clauses, wherein the (optionally, one or more of not-user-controlled, not-user-operated, user-controlled and user-operated) terminal periodically transmits (or receives or executes) the instructions of the subset, on an object-by-object or group-of-objects-by-group-of-objects basis, at one or more regular intervals of time, at one or more irregular intervals of time, together at one time, or in any combination thereof.

16. A method, terminal, system or, transitory or non-transitory computer-readable medium according to any one of the preceding clauses, wherein the at least one remote computer(s) is communicatively connected to one or more databases on which are stored the selected subset, and wherein the at least one remote computer(s) (or terminal(s)) initiate execution of, or execute, the instructions to delete (or otherwise prevent display of) the selected subset, in a predetermined time period based on instructions that are stored by the at least one remote computer(s) before any of the instructions to delete (or otherwise prevent display of) the selected subset are received by the at least one remote computer(s) (optionally, if they are received or sent from the terminal at all).

17. A method, terminal, system or, transitory or non-transitory computer-readable medium according to any one of the preceding clauses, wherein the calculation is performed in whole or in part by the terminal or by a terminal that is not under the control or operation of a user or users of the at least one remote computer(s).

18. A method, terminal, system or, transitory or non-transitory computer-readable medium according to any one of the preceding clauses, wherein the calculation is performed in whole or in part by one or more of the at least one remote computer(s) and a second set of at least one remote computers, any or all of the at least one remote computer(s) and second set of at least one remote computers being located in a domestic or foreign national country.

19. A method, terminal, system or, transitory or non-transitory computer-readable medium according to any one of the preceding clauses, wherein the instructions are calculated to simulate data acquisition based on sequential and stepwise GUI or other peripheral data collection via one or more of keyboard, mouse, and other peripherals connected to the terminal, wherein peripheral data collection is generated based on display or other peripheral output.

20. A method, terminal, system or, transitory or non-transitory computer-readable medium according to any one of the preceding clauses, wherein data received from one or more peripherals is simulated in order to collect the data representative of, or indicating, the subset of stored user account object data.

21. A method, terminal, system or, transitory or non-transitory computer-readable medium according to any one of the preceding clauses, wherein date-criteria data used in the calculation of the instructions is deduced from scanning user account object data for one or more of date-embedded, date-classified and date-uploaded media objects comprising one or more of photographic data, video data, and text data.

22. A method, terminal, system or, transitory or non-transitory computer-readable medium according to any one of the preceding clauses, wherein
the data representative of, or indicating, the one or more predetermined criteria for selecting the subset of the stored user account object data that were input or modified during prior access and control over the one or more user account(s) or associated user social network site accounts that at some prior time had permission to edit data in, or append data to, the stored user account object data, and
date-criteria data, optionally such that date-criteria data comprises a date such that data objects stored or uploaded to the at least one remote computer(s) before the date are identified for deletion or included in a set for deletion; are used to determine the subset of the stored user account object data.

23. A method, terminal, system or, transitory or non-transitory computer-readable medium according to any one of the preceding clauses, wherein the at least one remote computer(s) is controlled by one or more remote user(s), the one or more remote computer(s) not having access to control what criteria data are collected (or what one or more predetermined criteria are used) to calculate the subset of the user account object data at the terminal 24. A method, terminal, system or, transitory or non-transitory computer-readable medium according to any one of the preceding clauses, wherein at least one remote computer(s) execute(s) instructions to store object data uniquely associated with a different user account, which indicate successful deletion (or display prevention) of associated user account object data that were stored on the at least one database, and transmit the indicative data to other terminals associated with other user accounts.

25. A method, terminal, system or, transitory or non-transitory computer-readable medium according to any one of the preceding clauses, further comprising displaying or broadcasting confirmation that the subset of stored user account object data have been deleted from the at least one remote computer(s).

26. A method, terminal, system or, transitory or non-transitory computer-readable medium according to any one of the preceding clauses, wherein the subset is deleted, and optionally, the deleted subset of the stored user account object data includes all of the stored user account object data that were
input or modified during prior access to and control over the one or more social network site user account(s), and input or modified via access and control over associated social network site user account(s) that at some prior time had permission to edit data in, or append data to, the stored user account object data of the one or more social network site user account(s); and
stored on the database(s)
at least as early as or before, a specific date, which is (the specific date being, in whole or in part) the one or more predetermined criteria.

27. A method, terminal, system or, transitory or non-transitory computer-readable medium according to any one of the preceding clauses, wherein the terminal initiates simultaneous or (optionally digitally predetermined) periodic execution over a digitally predetermined time of, each and every instruction for all objects in the selected subset to the at least one remote computer(s).

28. A method, terminal, system or, transitory or non-transitory computer-readable medium according to any one of the preceding clauses, wherein when the terminal indirectly or directly transmits at least one instruction to the at least one remote (or local) computer(s) and the at least one instruction fails, one or more of:
the terminal indirectly or directly transmits (1) at least one error report, or (2) information on which the at least one error report is based,
at least one update computer (optionally on or not on the social network site computer network) receives at least one error report (directly or indirectly) from the terminal or another computer,
the update computer(s) sends instructions or information based on the error report(s) directly or indirectly to another terminal(s) that are one or more of previously, currently and subsequently on the social network site computer network, indicating error(s) and/or source of error(s), and a recalculation module (on any one or more of the terminal, another terminal, or on another computer) updates one or more of the modules (implicitly or explicitly) disclosed herein, by recalculating instructions, optionally to create new module instructions, which are distributed directly or indirectly to the terminal;

the terminal receives recalculated or updated instructions, optionally used to create new module(s) instructions.

29. A method, terminal, system, or computer readable media according to any one of the preceding clauses, comprising any one or more of:

a software module arranged to access, collect, and/or store one or more credentials data, deletion criteria data, and deletion timing data, each relating to the terminal or one or more social network site user account(s);

transceiving module arranged to receive deletion criteria data, either directly or indirectly to transmit the collected deletion criteria data (or optionally or alternately data representative of the collected deletion criteria data) to at least one computer (geographically local or geographically) remote from the terminal, the at least one remote computer having social network site user account object data stored thereon (or providing access to one or more databases on which the account object data are stored);

one or more of a store arranged to store and a display or user communication module arranged to display or broadcast results, including one or more of error indicia and completion indicia;

a second user communication module comprising a display module and/or a broadcast module arranged to display confirmation that object data have been deleted from the at least one remote computer.

30. A method, terminal, system, or computer readable media according to any one of the preceding clauses, comprising any one or more of:

a first means arranged to collect or access data uniquely representative of, or uniquely indicating, the one or more social network site user account(s) and transmitting data necessary to access and control the one or more digitally stored and operated social network site user account(s) to at least one remote computer(s);

a second means arranged to establish direct or indirect communication access and linkage between the terminal and the at least one remote computer(s) on which are stored, or by which access is available to delete, stored user account object data that were input or modified during prior access to and control over:

the one or more social network site user account(s) or associated social network site user account(s) that at some prior time had permission to edit data in, or append data to, the stored user account object data of the one or more social network site user account(s), the stored user account data of the one or more user account(s) uniquely accessible based on access data digitally pre-assigned only to the one or more social network site user account(s);

a third means arranged to display indicia, or broadcast data, representative of or indicating one or more predetermined criteria for selecting a subset of the stored user account object data;

a forth means arranged to collect data representative of, or indicating, the subset of the stored user account object data based on the one or more predetermined criteria for selecting the subset of the stored user account object data that were input or modified during prior access to and control over the one or more user account(s) or associated social network site user account(s) that at some prior time had permission to edit data in, or append data to, the user account object data of the one or more user account(s); and a fifth means arranged to transmit instructions to delete only the subset of the stored user account object data, according to the collected data representative of, or indicating, the one or more predetermined criteria for selecting the subset of the stored user account object data, from the terminal to the at least one remote computer(s);

wherein the instructions are calculated to cause the at least one remote computer(s) on which are stored, or by which access is available to delete, the stored user account object data, to, in whole (or optionally in part), delete the selected subset of the stored user account object data from at least one database on which are stored the subset of the stored user account object data, based on the one or more predetermined criteria, the instructions including selection and deletion of at least one copy of all stored user account object data in the subset of the user account object data.

31. A system according to any one of the preceding clauses or below claims, wherein the collecting of data representative of, or indicating, the subset of the user account object data, is simultaneous or performed at predetermined times based on at least one predetermined set of digital instructions, optionally pre-determined at least before the data representative of, or indicting, the display, broadcast or collection of data representative or indicating the predetermined criteria.

32. A system according to any one of the preceding clauses or below claims, further comprising storing the data representative of, or indicating, the one or more predetermined criteria for selecting the subset of the stored personal data.

33. A system according to any one of the preceding clauses or below claims, wherein the instructions are calculated to simulate data acquisition based on sequential and stepwise GUI or other peripheral data collection via one or more of keyboard, mouse, and other peripherals connected to the terminal, wherein peripheral data collection is generated based on display or other peripheral output.

34. A system according to any one of the preceding clauses or below claims, wherein the deleted subset of the stored user account object data includes all of the stored user account object data that were input or modified during prior access to and control over the one or more social network site user account(s) and input or modified via and access and control over associated social network site user account(s) that at some prior time had permission to edit data in, or append data to, the stored user account object data of the one or more social network site user account(s); and stored on the database(s) at least as early as, before a specific date, which is the one or more predetermined criteria.

35. A system according to any one of the preceding clauses or below claims, wherein if or when the terminal indirectly or directly transmits at least one instruction to the at least one remote or local computer(s) and the at least one instruction fails, one or more of:

the terminal indirectly or directly transmits (1) at least one error report, or (2) information on which the at least one error report is based, at least one update computer on or not on the social network site computer network receives at least one error report directly or indirectly from the terminal or another computer, the update computer(s) sends instructions or information based on the error report(s) directly or indirectly to another terminal(s) that are one or more of previously, currently and subsequently on the social network site computer network, indicating error(s) and/or source of error(s), and a recalculation module (on any one or more of the terminal, another terminal, or on another computer) updates one or more module(s), by recalculating instructions, optionally to create new module instructions, which are distributed directly or indirectly to the terminal;

the terminal receives recalculated or updated instructions, optionally used to create new module(s) instructions.

36. A computer storage apparatus according to any one of the preceding clauses or below claims, wherein the collecting of data representative of, or indicating, the subset of the user account object data, is simultaneous or performed at predetermined times based on at least one predetermined set of digital instructions, optionally pre-determined at least before the data representative of, or indicting, the display, broadcast or collection of data representative or indicating the predetermined criteria.

37. A computer storage apparatus according to any one of the preceding clauses or below claims, further comprising storing the data representative of, or indicating, the one or more predetermined criteria for selecting the subset of the stored personal data.

38. A computer storage apparatus according to any one of the preceding clauses or below claims, wherein the instructions are calculated to simulate data acquisition based on sequential and stepwise GUI or other peripheral data collection via one or more of keyboard, mouse, and other peripherals connected to the terminal, wherein peripheral data collection is generated based on display or other peripheral output.

39. A computer storage apparatus according to any one of the preceding clauses or below claims, wherein the deleted subset of the stored user account object data includes all of the stored user account object data that were input or modified during prior access to and control over the one or more social network site user account(s) and input or modified via and access and control over associated social network site user account(s) that at some prior time had permission to edit data in, or append data to, the stored user account object data of the one or more social network site user account(s); and stored on the database(s) at least as early as, before a specific date, which is the one or more predetermined criteria.

40. A computer storage apparatus according to any one of the preceding clauses or below claims, wherein if or when the terminal indirectly or directly transmits at least one instruction to the at least one remote (or local) computer(s) and the at least one instruction fails, one or more of:

the terminal indirectly or directly transmits (1) at least one error report, or (2) information on which the at least one error report is based, at least one update computer on or not on the social network site computer network receives at least one error report directly or indirectly from the terminal or another computer, the update computer(s) sends instructions or information based on the error report(s) directly or indirectly to another terminal(s) that are one or more of previously, currently and subsequently on the social network site computer network, indicating error(s) and/or source of error(s), and a recalculation module (on any one or more of the terminal, another terminal, or on another computer) updates one or more module(s), by recalculating instructions, optionally to create new module instructions, which are distributed directly or indirectly to the terminal;

the terminal receives recalculated or updated instructions, optionally used to create new module(s) instructions.

Embodiments can work with software, hardware, and/or operating system implementations other than those described herein. Any software, hardware, and operating system implementations suitable for performing the functions described herein can be used. Embodiments are applicable to both a client and to a server or a combination of both.

While it is apparent that the illustrative embodiments of the disclosure herein fulfil one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one or one set of embodiments may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed:

1. A method of one or more of (a) selectively reducing data available to, or processed by one or more computers communicatively connected to, a digitally stored and operated social network site, (b) improving data security and (c) increasing operational efficiency of the one or more computers communicatively connected to the digitally stored and operated social network site, at a terminal in a digital communications network, comprising:

displaying indicia, broadcasting data, or transmitting instructions, to solicit collection of or to access data uniquely representative of, or uniquely indicating, one or more digitally stored and operated social network site user account(s);

collecting or accessing data uniquely representative of, or uniquely indicating, the one or more social network site user account(s) and transmitting data necessary to access and control the one or more digitally stored and operated social network site user account(s) to at least one remote computer(s);

establishing direct or indirect communication access and linkage between the terminal and the at least one remote computer(s) on which are stored, or by which access is available to control stored user account object data that were input or modified during prior access to and control over:

the one or more social network site user account(s) or associated social network site user account(s) that at some prior time had permission to edit data in, or append data to, the stored user account object data of the one or more social network site user account(s), the stored user account data of the one or more user account(s) uniquely accessible based on access data digitally pre-assigned only to the one or more social network site user account(s);

displaying indicia, or broadcasting data, representative of or indicating one or more predetermined criteria for selecting a proper subset of the stored user account object data;

collecting data representative of, or indicating, the subset of the stored user account object data based on the one or more predetermined criteria for selecting the subset of the stored user account object data that were input or modified during prior access to and control over the one or more user account(s) or associated social network site user account(s) that at some prior time had permission to edit data in, or append data to, the user account object data of the one or more user account(s); and transmitting instructions to prevent display of only the subset of the stored user account object data, according to the collected data representative of, or indicating, the one or more predetermined criteria for selecting the subset of the stored user account object data, from the terminal to the at least one remote computer(s);

wherein the instructions are calculated to cause the at least one remote computer(s) on which are stored, or by which access is available to control, the stored user account object data, to, in whole or in part, prevent display of the selected subset of the stored user account object data from at least one database on which are stored the subset of the stored user account object data, based on the one or more predetermined criteria, the instructions including selection and legible display prevention of at least one copy of all stored user account object data in the subset of the user account object data.

2. The method according to claim 1, wherein one or more of:

(a) the instructions are transmitted at random intervals,
(b) the instructions are transmitted in parallel; and
(c) the collecting of data representative of, or indicating, the subset of the user account object data, is one or more of:

(1) simultaneous in time with respect to each and every one of the objects in the subset,
(2) performed at predetermined time(s) based on at least one predetermined (and/or pre-stored) set of digital instructions, the at least one predetermined set being pre-determined at a time(s) prior to or at least before predetermination of the data representative of, or indicating, the display, broadcast or collection of data representative or indicating the predetermined criteria,
(3) simultaneous or performed at predetermined times based on at least one predetermined set of digital instructions, pre-determined at least before the data representative of, or indicating, the display, broadcast or collection of data representative or indicating the predetermined criteria;
(4) simultaneous or performed at predetermined time(s) based on at least one predetermined set of digital instructions, the single or multiple times pre-determined at least before the data representative of, or indicating, the display, broadcast or collection of data representative or indicating the predetermined criteria;
(5) simultaneous based on at least one predetermined set of digital instructions;
(6) performed at predetermined time(s) based on at least one predetermined set of digital instructions;
(7) instantaneous;
(8) all completed before any of the instructions are transmitted;
(9) repeated for at least two of the user account object data before any of the instructions are transmitted;
(10) at least 10% completed before any of the instructions are transmitted;
(11) at least 20% completed before any of the instructions are transmitted;
(12) at least 30% completed before any of the instructions are transmitted;
(13) at least 40% completed before any of the instructions are transmitted;
(14) at least 50% completed before any of the instructions are transmitted;
(15) at least 60% completed before any of the instructions are transmitted;
(16) at least 70% completed before any of the instructions are transmitted;
(17) at least 80% completed before any of the instructions are transmitted;
(18) at least 90% completed before any of the instructions are transmitted;
(19) in whole or in part completed followed by the instructions being transmitted in parallel;
(20) in whole or in part completed followed by the instructions being transmitted at random intervals.

3. A method according to claim 1, wherein the at least one remote computer(s) are one or more of operated and controlled by a user or set of users other than the user or set of users of the terminal.

4. The method according to claim 1, further comprising storing the data representative of, or indicating, the one or more predetermined criteria for selecting the subset of the stored user account object data.

5. The method according to claim 1, wherein the at least one remote computer(s) at one time receive, forward to another of the at least one remote computers for execution, execute, or initiate execution of, the instructions for all objects in the selected subset.

6. The method according to claim 1, wherein the terminal transmits, or initiates simultaneous or periodic transmission over a digitally predetermined time of, each and every instruction for all objects in the selected subset to the at least one remote computer(s).

7. The method according to claim 1, wherein the instructions to prevent the display of the selected subset are executed to prevent display of each and every object of the selected subset, at a rate according to and limited only by the processing speed(s) and data transmission speed(s) of the at least one remote computer(s).

8. The method according to claim 1, wherein the speed or speeds at which the at least one remote computer(s) store and initiate execution of, the instructions is/are limited only by the time(s) at which the at least one remote computers receive the instructions for objects in the selected subset, and the time(s) between which the at least one remote computers receive the instructions for the objects in the selected subset and the time(s) when the at least one remote computers initiate execution of the instructions to delete the objects in the selected subset.

9. The method according to claim 1, wherein the terminal periodically transmits the instructions of the subset, on an object-by-object or group-of-objects-by-group-of-objects basis, at one or more regular intervals of time, at one or more irregular intervals of time, together at one time, or in any combination thereof.

10. The method according to claim 1, wherein the at least one remote computer(s) is communicatively connected to one or more databases on which are stored the selected subset, and wherein the at least one remote computer(s) initiate execution of, or execute, the instructions to prevent legible display of the selected subset, in a predetermined time period based on instructions that are stored by the at least one remote computer(s) before any of the instructions to prevent display of the selected subset are received by the at least one remote computer(s).

11. The method according to claim 1, wherein the calculation is performed in whole or in part by one or more of a user-operated terminal and by a terminal that is not under the control or operation of a user or users of the at least one remote computer(s).

12. The method according to claim 1, wherein the calculation is performed in whole or in part by one or more of the at least one remote computer(s) and a second set of at least one remote computers, any or all of the at least one remote computer(s) and the second set of at least one remote computers being located in a domestic or foreign national country.

13. The method according to claim 1, wherein the instructions are calculated to simulate data acquisition based on sequential and stepwise GUI or other peripheral data collection via one or more of keyboard, mouse, and other peripherals connected to the terminal, wherein peripheral data collection is generated based on display or other peripheral output.

14. The method according to claim 1, wherein data received from one or more peripherals is simulated in order to collect the data representative of, or indicating, the subset of stored user account object data.

15. The method according to claim 1, wherein date-criteria data used in the calculation of the instructions is deduced from scanning user account object data for date-embedded, date-classified, or date-uploaded media objects comprising one or more of photographic data, video data, and text data.

16. The method according to claim 4, wherein
the data representative of, or indicating, the one or more predetermined criteria for selecting the subset of the stored user account object data that were input or modified during prior access to and control over the one or more user account(s) or associated user social network site accounts that at some prior time had permission to edit data in, or append data to, the stored user account object data, and
date-criteria data;
are used to determine the subset of the stored user account object data.

17. The method according to claim 1, wherein the at least one remote computer(s) is controlled by one or more remote user(s), the one or more remote computer(s) not having access to control what criteria data are collected to calculate the subset of the user account object data at the terminal.

18. The method according to claim 1, further comprising displaying or broadcasting confirmation that the subset of stored user account object data have been deleted from the at least one remote computer(s).

19. The method according to claim 1, wherein at least one remote computer(s) execute(s) instructions to store object data uniquely associated with a different user account, which indicate successful display prevention of associated user account object data that were stored on at least one database, and transmit the data to other terminals associated with other user accounts.

20. The method according to claim 1, wherein the deleted subset of the stored user account object data includes all of the stored user account object data that were
input or modified during prior access to and control over the one or more social network site user account(s) and input or modified via and access and control over associated social network site user account(s) that at some prior time had permission to edit data in, or append data to, the stored user account object data of the one or more social network site user account(s); and
stored on the database(s)
at least as early as orbefore, a specific date, which is the one or more predetermined criteria.

* * * * *